United States Patent [19]
Law
[11] 4,168,327
[45] Sep. 18, 1979

[54] SPACE-CHARGE CONTROLLED ELECTROSTATIC SPRAYING

[75] Inventor: S. Edward Law, Athens, Ga.
[73] Assignee: Research Corporation, New York, N.Y.

[21] Appl. No.: 664,239
[22] Filed: Mar. 5, 1976
[51] Int. Cl.[2] ........................ A01G 5/06; A01N 1/00; A01N 3/00
[52] U.S. Cl. ........................................ 427/4; 427/10; 427/27
[58] Field of Search ....................................... 427/8-10, 427/4, 27

[56] References Cited

U.S. PATENT DOCUMENTS

| | | | |
|---|---|---|---|
| 3,094,049 | 6/1963 | Snelling | 118/646 X |
| 3,801,349 | 4/1974 | Wilson et al. | 427/10 |
| 3,872,824 | 3/1975 | Erny et al. | 427/10 |
| 3,920,436 | 11/1975 | Janssen | 427/4 |
| 3,954,719 | 5/1976 | Pirck et al. | 427/27 |

OTHER PUBLICATIONS

Smith, p. 2689, IBM Tech Dis. Bull., vol. 17, No. 9, Feb. 1975.

*Primary Examiner*—Bernard D. Pianalto
*Attorney, Agent, or Firm*—Cooper, Dunham, Clark, Griffin & Moran

[57] ABSTRACT

Disclosed is a low volume, space-charge controlled electrostatic spraying which is particularly suitable for use in agriculture but is applicable to industrial and other settings as well. A substance is sprayed through a relatively low voltage nozzle producing finely divided, electrostatically charged particles of the substance. The charged particles are liquid droplets or dust particles, and are about 50 microns or less in size. The space-charge density of the charged particles is monitored, and the deposition of particles on a calibration target is measured at different space-charge densities to establish an optimal space-charge density corresponding to optimum (e.g., maximum or most uniform) deposition. As the charged particles are subsequently directed to target objects, such as plants, the space-charge density is monitored and the spraying and/or charging systems are controlled to maintain the established optimal level which corresponds to optimal deposition.

12 Claims, 9 Drawing Figures

Fig. 1.
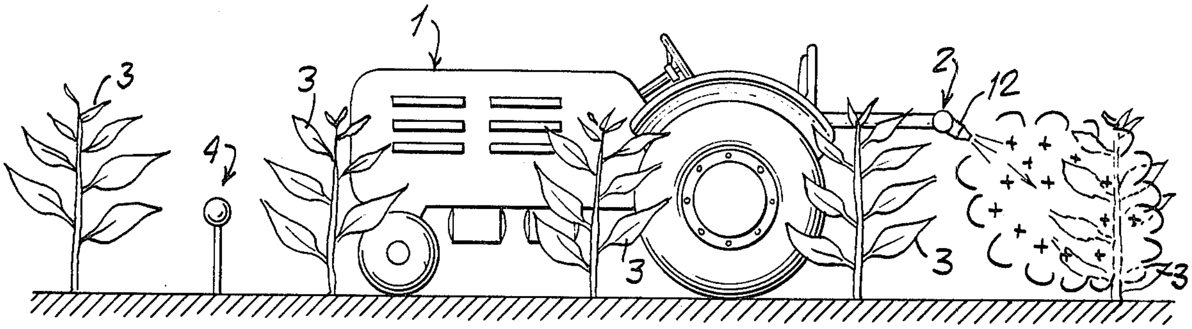
Fig. 2.
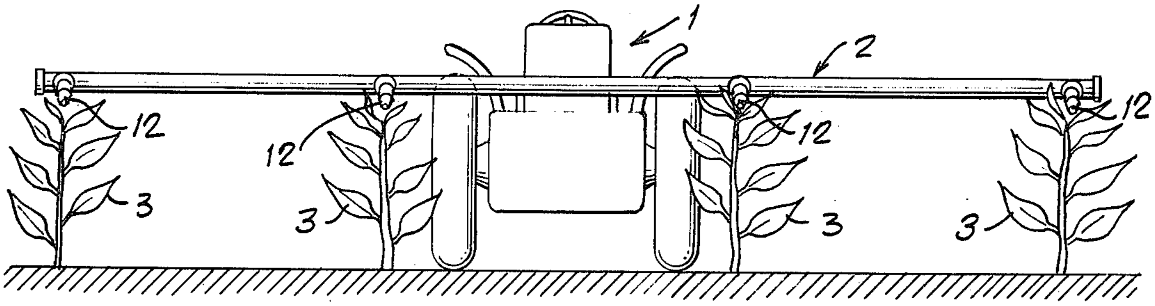
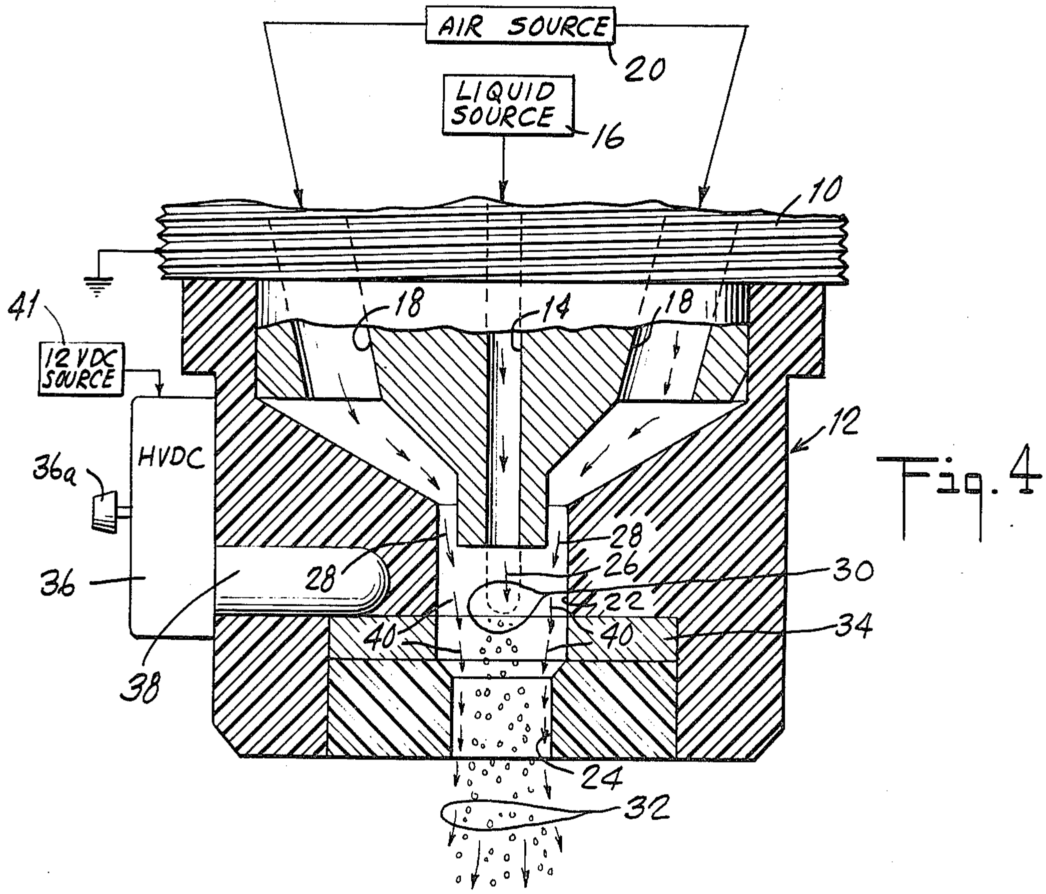
Fig. 4.

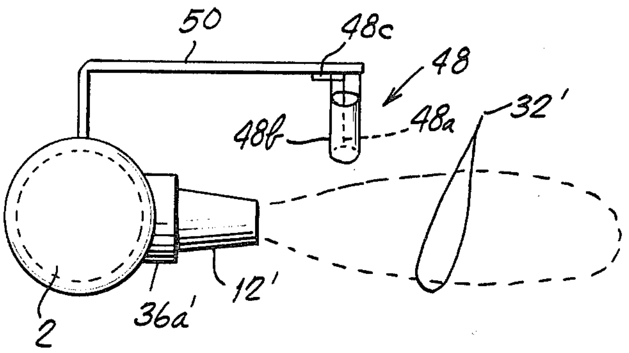
Fig. 7.
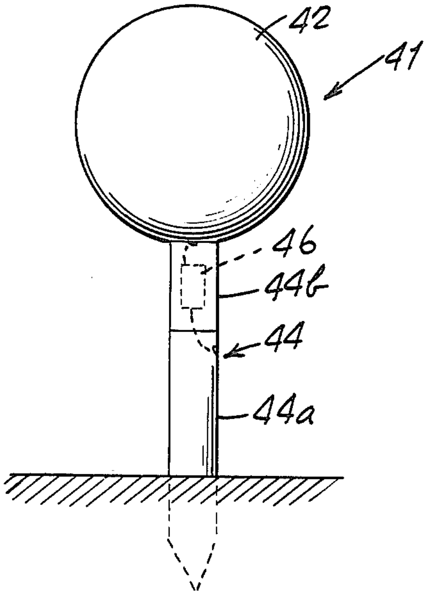
Fig. 8.
Fig. 9.
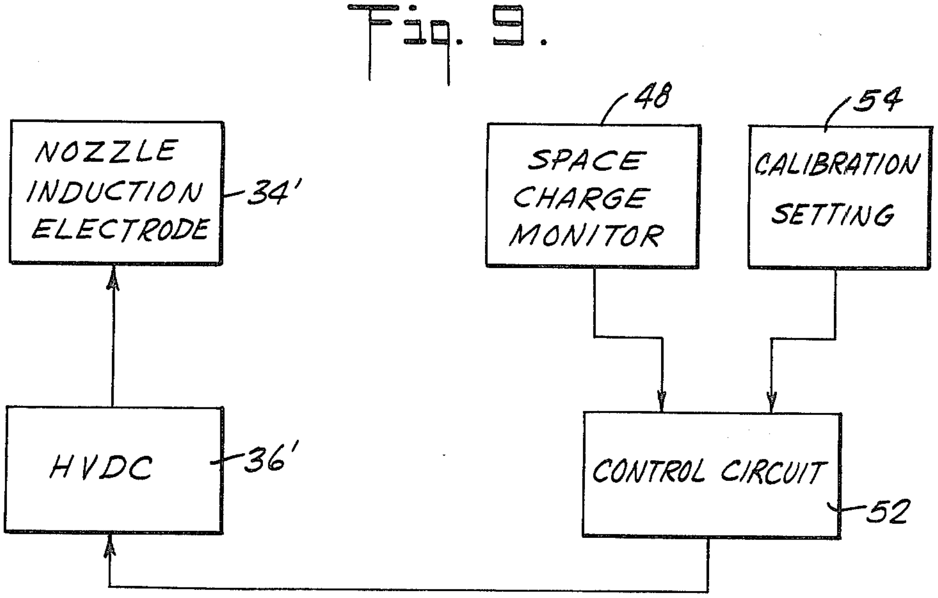

SPACE-CHARGE CONTROLLED ELECTROSTATIC SPRAYING

BACKGROUND AND SUMMARY OF THE INVENTION

The invention is in the field of electrostatic spraying and relates particularly to space-charge controlled, low volume electrostatic spraying which is particularly suitable to agricultural environments but is useful in industrial and other environments as well.

Low volume electrostatic spraying has been used from time to time in agriculture to spray pesticides on crops. For example, Point U.S. Pat. No. 3,339,840 illustrates electrostatic spraying of tobacco crops with fungicide powder particles of an average diameter of about 10 to 30 microns which are charged by electrodes maintained at 150,000 volts. As opposed to the fairly wide use of such spraying in industry, its use in agriculture has been rare, for a variety of reasons including the hazard associated with the high voltages that have been needed to charge the spray particles and the uncontrollable changes in the open environment of agricultural spraying. For example, while it may be relatively easy and convenient in an industrial setting to properly shield electrically the area where electrostatic spraying takes place, so as to avoid the danger of an electric shock from the charging voltages that are typically of the order of 100,000 volts, it is generally not possible to do so in an agricultural setting, where spraying typically takes place from a moving vehicle exposed to atmospheric conditions and operated by personnel unskilled in using such high voltages. Moreover, while it may be possible to properly calibrate and optimize the many relevant parameters in an industrial setting, this may not be easy in an agricultural setting where parameters such as the humidity of the air and many other electrical characteristics of the environment can not be controlled. Still further, while it may be possible in an industrial environment to calculate or otherwise find an optimal value of certain parameters, such as charging voltage, distance between the spray nozzle and the sprayed object, etc., it has been often impractical or impossible to do so in an agricultural setting, where the relevant parameters change often and where there are few specialists in electrostatics.

There has been no practical and accepted system for electrostatic deposition in agriculture despite the great need for it and despite the great benefits that it would have brought about. For example, presently used, non-electrostatic spray application techniques are grossly inefficient; spray particle deposition efficiencies of less than 20% are typical in commercial crop growing. Moreover, the typical non-electrostatic spraying methods may use as much as 200 to 400 gallons of pesticide spray per acre, while it would be possible to use as little as 5 gallons or less per acre at the low volume spraying rates that are possible with electrostatic deposition. At such low volume spray rates there would be additional considerable savings of capital investment in storage and spraying equipment, savings in energy expenditures, and reduced danger to the environment, because of the considerably lower quantity of the substance needed for spraying a given area.

With this background, an object of the invention is to make it possible to widely use electrostatic deposition in agricultural environments, and to also make it possible to use simple and efficient electrostatic spraying in industrial and other environments as well.

In one embodiment of the invention, a substance is sprayed through a novel type electrostatic spray nozzle capable of operating efficiently at low charging voltages, of the order of a few thousand volts, e.g., 2 or 3,000 volts, as compared to the prior art where the typical operating voltages are of the order of 100,000 volts. All of the high voltage components of the new nozzle are enclosed, so as to make it safe for use in open environments such as in agriculture. The nozzle uses gas under pressure to form a stream of finely divided, electrostatically charged particles. A parameter related to the electrical space-charge density of the charged particles is monitored as the particles are directed for deposition on a calibration target simulating the actual target objects which are to be sprayed. The deposition of the charged particles on the calibration target is measured while the monitored parameter is varied, and the space-charge density corresponding to an optimal (maximum) deposition of the charged particles on the calibration target is chosen as a desirable one. Suitable controls are then set to maintain the space-charge density during actual spraying of target objects within a selected range corresponding to the selected optimum value of the monitored parameter which was found to give optimal deposition of particles on the calibration target.

It has been found that for any given environment there is an optimal space-charge density which results in optimal deposition of particles on any given target surface. The term "optimal" can be defined as "maximum" deposition for a given amount of material sprayed or as a "most uniform" deposition, or as some compromise between the overall amount of the particles deposited on the targets and the targets and the distribution of the deposition. Deviation from the optimal space-charge density in either direction means less than optimal deposition of particles on the target surfaces. The specific optimal space-charge density depends on so many different factors that it is difficult to calculate in many environments and is indeed impractical or impossible to calculate in an agricultural environment. Therefore, the monitoring, in accordance with the invention, of a parameter related to the space-charge density, while varying the space-charge density and depositing charged particles on a calibration target simulating the intended target objects, solves the optimization problem in a simple but effective manner. This approach makes it possible to use optimal electrostatic spraying in agricultural environments or any other environment where it is impossible or impractical to otherwise calculate or find the optimal space-charge density of the sprayed charged particles.

Thus, it has been found that there is a critical value for space-charge density of the sprayed particles and that departure therefrom results in less than optimal particle deposition on targets, with extreme departure from the critical space-charge level (either too high or too low) resulting in only marginal improvement in deposition efficiency over the spraying of particles which are not electrostatically charged. To establish reliability and increase efficiency in the electrostatic deposition of charged particles on plant surfaces or other targets, and to maximize particle deposition on such targets, it has been found, in accordance with the invention, highly desirable to sense the space-charge density of the charged particles, to find the optimum level thereof, and to automatically maintain this optimum level while depositing on the target objects. This is done, in accordance with the invention, such that the monitoring does not significantly disturb the charged particles and inherently compensates for changes in factors (such as ion concentration in the air, resistivity of the sprayed particles, inadvertent changes in spray flowrate or in fineness of particle atomization, etc.) which influence the sensed space-charge density and the cloud-breakdown problem near the sprayed targets.

There have been techniques in the prior art to monitor variables related to the space-charge density of electrostatically charged particles. For example, Ransburg et al. U.S. Pat. No. 2,509,277 discloses a system measuring the discharge current from an electrostatic spray gun used in an industrial environment and controlling the charging voltage so as to prevent arcing of the discharge current over to the grounded target or to other objects. This technique presupposes knowing what charging voltage would cause arcing before the control circuit can be calibrated accordingly, and also presupposes that there will be no substantial changes in the environment variables that affect arcing once the control circuit is calibrated. In general no such factors can be presupposed in agricultural or other uncontrolled environments. In contrast, the invention provides a simple and efficient way of determining exactly what the optimal space-charge density would be under any given conditions, without a previous knowledge of what it shoud be, and a way of maintaining such space-charge density for optimal deposition and not just to prevent arcing. As another example, Larsen et al. U.S. Pat. No. 2,767,359 shows a system in which the discharge voltage of a spray system is controlled so that the discharge current between the charging electrodes is constant. Again, this presupposes knowing what the discharge current should be in the first place, but does not find what would be an optimal space-charge density for optimal deposition of particles. As a still another example, Walberg U.S. Pat. No. 3,641,971 shows a system in which a control circuit is provided for cutting off the electrical power to a spray gun if the gun gets too close to a grounded object and thus causes a surge of the discharge current. This is only a protective device, and does not relate to finding an optimal value for the space-charge density of the sprayed charged particles.

In summary, the invention provides a significant improvement over the prior art and enables electrostatic spraying to be efficiently and safely used in many difficult environments, including agricultural environments. It uses a low volume spray nozzle, which is particularly safe to use in uncontrolled environments, to produce finely divided, electrostatically charged particles that may be liquid or solid. The charged particles are monitored to sense the value of a parameter related to their space-charge density. The particles are first deposited on a calibration target simulating the ultimate target object, and the space-charge density of the stream is varied while the degree and/or quality of the deposition on the test object is measured. The space-charge density corresponding to optimal deposition is thereafter maintained while the charged particles are being deposited on the target object.

BRIEF DESCRIPTION OF THE DRAWINGS

FIG. 1 is a schematic side view of a vehicle for electrostatically depositing a substance on plants.

FIG. 2 is a back view of the arrangement shown in FIG. 1.

FIG. 4 is a sectional view of an electrostatic spray nozzle suitable for use in the invention.

FIG. 7 is a schematic view of a spray nozzle and a device for monitoring the space-charge density of a stream of charged particles issuing from the nozzle.

FIG. 8 is an elevational view of a test object simulating the target objects for electrostatic spraying.

FIG. 9 is a block diagram of a feedback circuit for maintaining an optimum space charge density.

DETAILED DESCRIPTION

Figure 3:
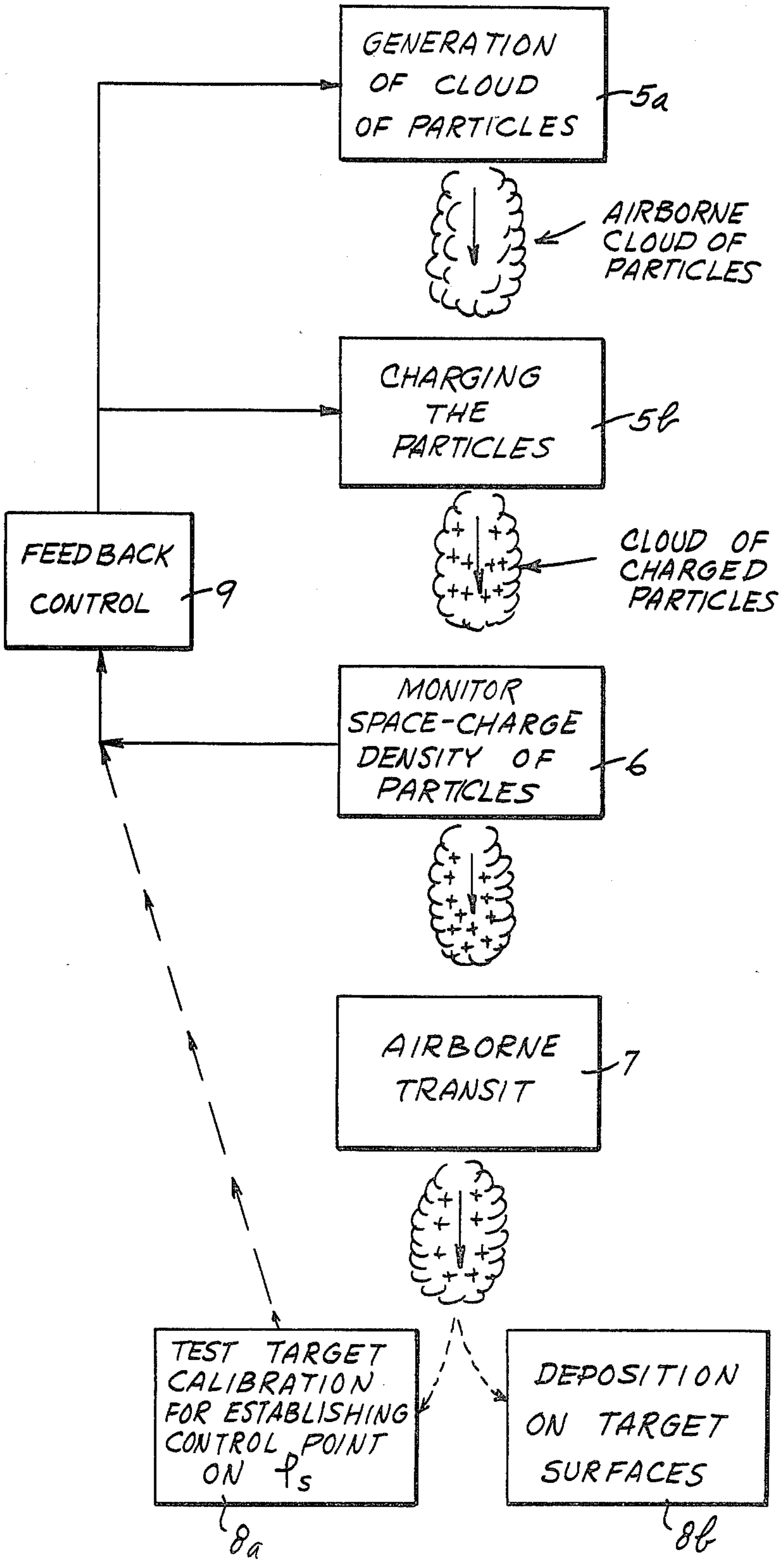
FIG. 3 is a block diagram illustrating the major steps in practicing the invention.

Referring to FIGS. 1 and 2, one examplery use of the invention is in electrostatically depositing a pesticide substance on target objects, which in this case are plants. The pesticide is carried by a vehicle 1 which has an appropriate reservoir **1*a* for the pesticide liquid, an appropriate supply 1*b* of air under pressure and a low-voltage power supply such as a 12 or a 24 volt battery (not shown). The vehicle carries a boom 2 extending laterally from the rear thereof and carrying a number of spray-charging nozzles 12. Each of the nozzles is connected through suitable conduits (not shown) to the pesticide reservoir 1*a*, the air supply 1*b* and the low voltage electrical power supply of the vehicle 1. As the vehicle 1 moves in the indicated direction along rows of plants 3, each nozzle forms the pesticide into finely divided, electrostatically charged particles which are deposited on the plants 3. Each nozzle 12 charges the particles issuing therefrom to a selected, unipolar level of space-charge density and cloud current. As the vehicle 1 moves in the indicated direction, the boom 2 passes over a calibration target 4 which is placed in the typical environment of the target objects 3 and simulates the target objects 3. The calibration target 4 includes means which sense the rate of deposition of particles thereof (or the amount of particles deposited thereon or some other parameter related to the amount and/or quality of deposition) and provide an indication of the sensed parameter. By making multiple passes over the same calibration target 4 at different selected space-charge densities, or by providing a row of calibration targets 4 and changing the space-charge density of the particles issuing from the nozzles 12 as the vehicle moves from one calibration target to another, it is found what space-charge density results in a maximum and most uniform, or otherwise best, deposition of particles on the calibration targets. This space-charge density is then selected as an optimum one, and a control circuit is set to maintain this optimal space-charge as the vehicle proceeds to spray the plants 3. Alternately, a calibration target 4 may be secured to the vehicle 1 to move therewith, and can be periodically introduced into the environment of the target objects and exposed there to the charged particles issuing from the nozzles 12 while the space-charge density of the particles is being varied so as to find the space-charge density giving best deposition on the calibration target 4** and to accordingly set a control circuit for maintaining the setting as the plants 3 are being sprayed.

Referring to FIG. 3 for a review of the major steps of the invention, a substance such as a pesticide is converted at step 5*a* into a cloud of finely divided, airborne particles, and the particles are electrostatically charged at step 5*b* to form a cloud of charged particles. The electrical space-charge density of the cloud of charged particles is monitored at step 6, and the charged particles are transported by airborne transport at step 7 for deposition at step 8*a* on a calibration target for calibration to establish a control point for the space-charge density ($\rho_s$) which would give optimal depositon. The results from monitoring the space-charge at step 6 and from measuring the deposition on the calibration target at step 8*a* are applied to a feedback control 9 for controlling one or both of steps 5*a* and 5*b* to provide a cloud of charged particles whose space-charge density is at the found optimal level, and to maintain such optimal level while the cloud of charged particles is being deposited at step 8*b* onto target objects. It should be clear that some of the steps may take place simultaneously, and/or can take place in a different order.

Although other spray nozzles could be used to provide the stream of charged particles required to practice this invention, one spray nozzle which has been found particularly suitable is shown in FIG. 4 and is described in detail in the copending application of the inventor herein entitled "Electrostatic Spray Nozzle System" and filed on July 9, 1975 and assigned Ser. No. 594,266. The entire subject matter disclosed in said copending application is hereby incorporated by reference into this specification.

The nozzle 12 shown in FIG. 4 has numerous advantages described in detail in said copending application. Briefly, the nozzle 12 is particularly suitable for agricultural use, all of its high voltage components are enclosed so as to prevent hazard and mechanical damage, and it is simple to operate and maintain in difficult environments. The nozzle 12 comprises a generally tubular body formed of a base 10 and a housing 12 arranged generally coaxially and affixed to each other. The base 10 has an axially extending central conduit 14 receiving at its back end liquid under pressure from a liquid source schematically shown at 16. The base 10 further has a separate, forwardly converging conduit 18 receiving at its back end a gas such as air under pressure from a source schematically shown at 20. The liquid source 16 and the air source 20 are connectible through suitable conduits (not shown) to the pesticide source 1*a* and the air source 1*b* respectively of the vehicle 1. Each conduit may have suitable pressure regulating means (not shown) to indivudlally regulate the liquid and air pressures and flow rates to each nozzle 12. The air conduit 18 may be in the form of separate passageways, converging toward the front end of the conduit 14, as is conventional in pneumatic automizing nozzles. The housing 10 has an axially extending nozzle passage which is coaxial with the liquid conduit 14 and comprises a tubular passage 22 and a coaxial tubular passage 24 of the same diameter as the passage 22 or of a reduced diameter, which terminates at a spray orifice at the front end of the housing 12. The back end of the passage 22 in the housing 12 communicates with the front end of the liquid passage 14 and the air passage 18 to receive therefrom a liquid stream 26 and an air stream 28 respectively. The liquid stream 26 and the air stream 28 interact with each other at a droplet forming region 30, where the kinetic energy of the high velocity air stream 28 shears the liquid stream 26 into droplets and the remaining kinetic energy of the air stream 28 carries forward the resulting droplet stream 32 and additionally forms a boundary slipstream 40. The droplets of the droplet stream 32 are finely divided and are typically about 50 or less microns in diameter, although there may be substantial occasional deviations from that typical size. An annular induction electrode 34, made of an electrically conductive material such as brass or another metal, is embedded in the housing 12 and surrounds the passage 22 in the vicinity of the droplet forming region 30 such that the electric field lines due to potential difference between the electrode 34 and the liquid stream 26 can terminate in a concentrated manner onto the liquid stream 26. The induction electrode 34 is maintained at a potential with respect to the liquid stream 26 of several hundred to several thousand volts by a high voltage source 36. The source 36 is affixed to the housing 12 and has a high voltage output connected to the electrode 34 through a high voltage lead 38 and a low voltage input connected to a low voltage source 41. The high voltage source 36 converts the low voltage input to a selected high voltage output, e.g., converts a 12 volts (or a 24 volt) DC current from the source 41, which may be the battery carried by the vehicle 1, to a current at a high DC voltage which can be adjusted within the range of several hundred to several thousand volts DC at either polarity with respect to the liquid 26 and ground. High voltage sources of this type typically include an oscillator powered by the low voltage DC source and producing an AC output, a transformer converting the AC output of the oscillator to a high AC voltage of a selected level, a rectifier converting the high voltage AC output from the transformer to a DC voltage, a possible smoothing filter, and some adjustable means 36*a* to control the output DC level, such as by adjusting the transformer ratio or by varying the low-voltage input level. The base 10 is made of an electrically conductive material and is typically kept at or close to ground potential.

As the droplet stream 32 is formed at the droplet forming region 30, each droplet is charged inductively, and the charged droplets are carried forward and out of the spray nozzle by a portion of the kinetic energy of the air stream 28. Because of the shown configuration of the nozzle, an air slipstream 40 forms around the droplet forming region 30 and the droplet stream 32, to keep the inner surface of the electrode 34 completely dry and smooth, and to thus prevent droplets from being deposited on the inner surface of the electrode 34. Furthermore, the slipstream 40 continues to surround the droplet stream 32 as it travels through the nozzle passages 22 and 24, thereby keeping these passages dry and maintaining at a high level the surface resistance of the insulating material thereof. The spray charge density and the spray cloud current of the stream 32 of charged particles are a function of the voltage 34 for typically used liquid flow rates, and are additionally a function of other controllable variables such as the size of the droplets forming the stream 32 and the like.

Figure 5:
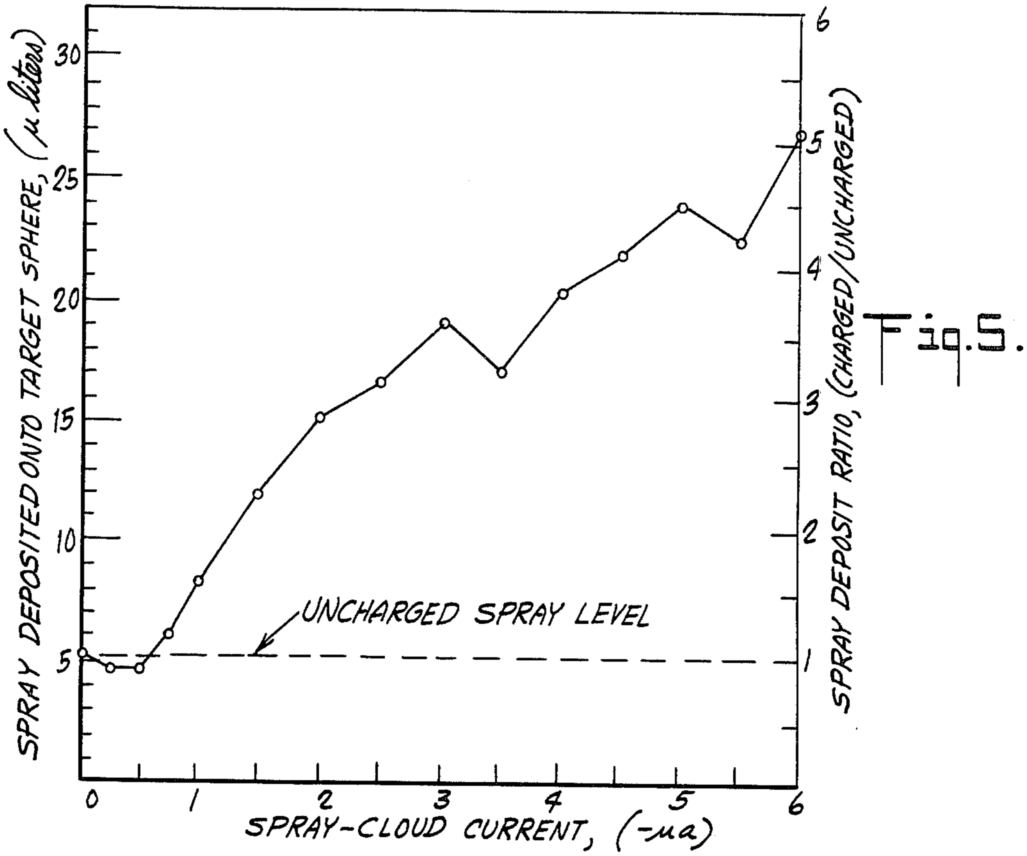
FIG. 5 is an illustration of the relationship between the spray cloud current of charged particles and the amount of particles deposited on a smooth calibration target.

It is known that under proper conditions the volume of particles deposited electrostatically on target objects generally increases with the spray cloud current and the space-charge density of the charged particles. Referring to FIG. 5, which shows a graph of spray cloud current versus volume of spray deposited onto a target sphere, said graph resulting from a series of laboratory tests conducted by the inventor herein, it is seen that the spray deposit ratio increases steadily with an increase of spray cloud current and space charge density. The term "spray deposit ratio" is defined as the ratio between the volume of spray deposited by charged particles and the volume of spray deposited by uncharged particles when the other relevant parameters are kept substantially constant.

Figure 6:
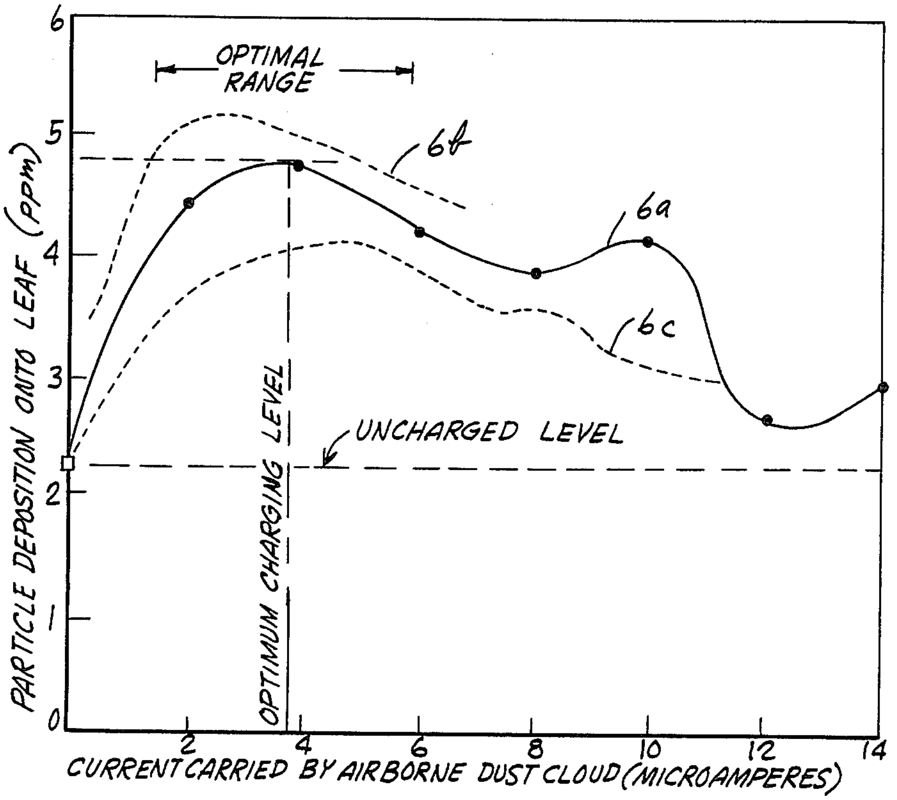
FIG. 6 is an illustration of the relationship between the current carried by a cloud of charged particles and the particle deposition on a different calibration target.

It has been found, however, that higher spray cloud current and higher space-charge density would not necessarily mean a higher spray deposit ratio. Because of factors such as gaseous breakdown and conduction between grounded conducting objects and charged particle clouds, there is an optimum range of levels of spray cloud current and space charge density of the charged particles which gives most deposition and most uniform deposition of particles on any given target surface for any given set of conditions. Referring to curve 6-*a* in FIG. 6, it is seen that when the particles have been charged to space-charge levels either less than or greater than a critical value at point A, the result is less than maximum particle deposition on targets which have or are near to electrically grounded points. Extreme departure from the best, critical space charge level (either too high or too low) can result in only marginal improvement in deposition efficiency as compared to that of uncharged particles. However, an optimal range can be selected, as indicated, to give deposition which is a substantial improvement over that by uncharged particles. If the space-charge density is maintained in that optimal range, then improved deposition can be insured. Moreover, while the environment properties may change somewhat in the course of spraying, with the result that examplary curves 6*b* or 6*c* may be true for the new environmental conditions rather than curve 6*a*, the optimal space-charge range would still give improved deposition, provided, of course, that the departure from the conditions producing curve 6*a* had not been extreme.

In order to find what electrostatic properties of the charged particles would give best deposition in a given environment, even in cases where it is not possible or practical to calculate or otherwise predict values for such properties, the invention provides for varying the electrostatic properties of the particles while spraying a calibration target and measuring the deposition thereon while concurrently sensing a parameter of the spray related to the electrostatic properties of the particles. Referring to FIGS. 7 and 8, for an illustrative example, the stream 32' of the charged particles from the nozzle 12' is directed for deposition on a calibration target 4' comprising a metal sphere 42 supported on a spike 44. The lower portion 44*a* of the spike 44 is made of an electrically conductive material and is in electrical contact with ground, while the upper portion 44*b* of the spike 44 is made of an electrical insulating material. The metal sphere 42 and the metal portion 44*a* of the spike 44 are interconnected electrically through a circuit 46 which integrates the current flowing between the sphere 42 and the grounded portion 44*a*. A space-charge monitoring device, generally indicated at 48, is secured to the boom 2 by a support arm 50 to monitor the space-charge density of the stream 32' of the charged particles from the nozzle 12'. The monitoring device 48 includes a transducer, for example of the gaseous discharge type, which responds to the same atmospheric and operational variables that cause changes in the gaseous breakdown and discharge currents from grounded points of the target objects being sprayed. Thus, the monitoring device 48 is inherently able to compensate for changes in those factors (such as air ion concentration, resistivity of the particles, etc.) which influence the severity of the cloud breakdown problem in the region of the target objects that are being sprayed. The examplary gaseous discharge transducer of the monitoring device 48 comprises a pointed electrode 48*a* and a grounded cylindrical electrode 48*b* disposed coaxially around it, and a circuit 48*c* interconnecting the two electrodes 48*a* and 48*b* and measuring the gaseous discharge current flowing between the pointed electrode 48*a* and the nearby charged stream 32'. Other types of transducers for measuring the space-charge density of the particles issuing from the nozzles 12 may be used instead of the gaseous discharge type, such as transducers utilizing physical phenomena including, but not limited to, electrostatic induction, electromagnetic induction, electrostatic force, and electromagnetic force. The transducer, whatever its type may be, should preferably be essentially non-dissipative, in the sense that it does not dissipate a substantial part of the relevant characteristic of the stream of charged particles. This can be accomplished by monitoring continuously, but in such a way that only a negligible portion of the spray-stream's current is drawn off for monitoring purposes. Alternately, a large amount of the current can be drawn off, but only over a very short, periodic time intervals, with a very low duty cycle.

In operation, the stream 32' is directed for deposition on the calibration target 4' under approximately the same environment as the ultimate target objects 4, and such that the position of the spray nozzle 12' with respect to the calibration target 4' approximates the position of the nozzle with respect to the ultimate target objects 4. The nozzle 12' is passed over the calibration target 4' at approximately the same speed as the speed of the vehicle 1 when spraying the target objects 4, and the control 36*a'* of the nozzle 12' is reset before each pass to apply a different charging voltage to the induction electrode of the nozzle 12', so as to charge the particles of the stream 32' to a corresponding different space-charge density and cloud current. The deposition on the calibration target 4' for each pass is sensed by measuring the current between the metal sphere 42 and the conductive portion 44*a* of the spike 44, since this current is a direct result of the deposition of charged particles on the sphere 41 and is proportional thereto. The measurement of the monitoring device 48 corresponding to the highest amount of current integrated by the circuit 46 for a single pass is chosen as a calibration setting, and the nozzle 12' is thereafter controlled to maintain the same measurement of the monitoring device 48.

Referring to FIG. 9 for an illustration of the operating principles, a control circuit 52 receives an input from a calibration setting 54 and and from the space charge monitor 48 and controls the high voltage DC supply 36' of the nozzle 12' to maintain the induction electrode 34' of the nozzle at the voltage which would produce a measurement of the space-charge monitor 48 corresponding to the calibration setting. The calibration setting 54 can be a voltage source manually settable to provide a selected voltage output corresponding to the measurement provided by the monitoring device 48 at the pass giving best deposition on the test object 4'. The control circuit 52 can be a voltage comparator comparing the voltage outputs of the calibration setting 54 and the space-charge monitor 48 while the nozzle is spraying the target objects and providing a control signal increasing the voltage of the induction electrode when the monitored voltage is below a certain value with respect to the calibration setting voltage and decreasing the electrode voltage when the monitoring voltage is above that value.

It is noted that a number of calibration targets 4′ may be arranged in a row and the space-charge density of the nozzle 12′ varied as the nozzle moves along the row so that the optimum space-charge density can be found in a single pass or in a few passes over the row. The integrated current signals may be read directly from each test object 4′ of the row, or the individual test objects may be connected by cable or by telemetry to a single, central network for integrating the current of each and indicating which test target has received best deposition. Such central network may operate in conjunction with the controls for spraying to automatically select a charging voltage setting (or flow-rate, particles size, etc. setting) corresponding to "best" deposition. Still alternately in certain cases it may be found desirable to have a calibration target 4′ attached to and moving with the vehicle 1 at about the same attitude thereto as the target objects 4, and to periodically integrate the current induced on the calibration target 4′ due to spraying so as to select the best spraying parameter or to simply check to see if the present spraying parameters still give good deposition. It is also noted that the space-charge density and cloud current can be varied not only by varying the induction electrode voltage but also by varying the liquid flow rate through the nozzle, the fineness of the droplets and the spatial dispersion of the stream of charged particles, and that any one of any combination of these variables may be controlled to maintain a selected space-charge density and cloud current.

I claim:

1. A method of electrostatically depositing a substance on target objects comprising the steps of:

forming the substance into a stream of finely divided electrostatically charged particles while concurrently monitoring an electric property of the stream related to the electrical space-charge density of the stream;

providing a calibration target simulating a target object, depositing said particles on the calibration target at different space-charge densities, sensing the deposition on the calibration target at the different space-charge densities of the stream to find an optimal deposition, and selecting a value or values of the monitored electrical property of the stream corresponding to the space-charge density at said optimal deposition of the particles on the calibration target; and depositing the particles on the target objects and controlling the forming step to maintain the monitored electrical property of the stream within a range corresponding to said selected value of one of said selected values.

2. A method as in claim 1 wherein the monitoring step comprises monitoring the cloud discharge current of the stream of particles at a region adjacent the region where the charged particles are formed.

3. A method as in claim 1 wherein the sensing step comprises measuring a current flow induced in the calibration target by charged particles deposited thereon.

4. A method as in claim 1 wherein the forming step includes inductively charging said particles and the step of controlling the forming step comprises controlling the charging voltage in said inductive charging.

5. A method of electrostatically depositing a substance on target objects comprising the steps of:

forming the substance into electrostatically charged particles, varying the electrostatic properties of the particles while depositing the particles on a calibration target simulating the target objects, and finding the value of an electrical property of the particles related to said electrostatic properties thereof which value corresponds to best deposition on the calibration target; and depositing the particles on the target objects and maintaining the electrostatic properties of the particles within a range corresponding to the found value of said electrical property of the particles.

6. A method as in claim 5 wherein the step of finding said value of an electrical property of the particles comprises sensing the space-charge density or cloud discharge current of the particles while measuring a current flow induced in the calibration target by charged particles deposited thereon and finding the value of said space-charge density or cloud discharge current at an optimal current flow induced in the calibration target.

7. A method as in claim 6 wherein the forming step includes inductively charging said particles and the maintaining step comprises controlling the charging voltage utilized in inductively charging said particles to cause said electrical property of the charged particles to remain at said found value thereof.

8. A method as in claim 5 wherein the step of varying the electrostatic properties of the particles while depositing the particles on a calibration target simulating the target objects comprises varying the space charge density of the stream of charged particles.

9. A method as in claim 8 wherein the step of forming includes inductively charging said particles and the step of varying the space-charge density of the particles includes varying the charging voltage in the course of said inductive charging of the particles.

10. A method of electrostatically depositing a substance on target objects comprising the steps of:

forming the substance into a stream of finely divided electrostatically charged particles having typical dimensions of the order of tens of microns;

varying the electrostatic properties of the stream of charged particles while depositing the particles on a calibration target simulating the target objects;

finding an electrical property of the charged particles related to the electrostatic properties thereof which correspond to best deposition of the charged particles on the calibration target; and depositing the particles on the target objects and maintaining the electrostatic properties of the particles within a range corresponding to the found electrical property thereof.

11. A method as in claim 10 wherein the forming and depositing steps take place in open air environment, in the course of depositing a substance by means of a moving vehicle onto plants in an open field.

12. A method of electrostatically depositing a substance on plants comprising the steps of forming the substance into a stream of finely divided, electrostatically charged particles, depositing said particles on the plants while monitoring a selected electrical property of the stream of charged particles related to the electrical space-charge density of the stream, selecting a range of the monitored property corresponding to optimum deposition of the charged particles on the plants and controlling the forming step to maintain the monitored property within said selected range.

* * * * *